(12) United States Patent
Tadano

(10) Patent No.: US 10,331,094 B2
(45) Date of Patent: Jun. 25, 2019

(54) PERIODIC EXTERNAL DISTURBANCE SUPPRESSION CONTROL DEVICE

(71) Applicant: MEIDENSHA CORPORATION, Tokyo (JP)

(72) Inventor: Yugo Tadano, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 218 days.

(21) Appl. No.: 15/114,659

(22) PCT Filed: Jan. 30, 2015

(86) PCT No.: PCT/JP2015/052767
§ 371 (c)(1),
(2) Date: Jul. 27, 2016

(87) PCT Pub. No.: WO2015/115623
PCT Pub. Date: Aug. 6, 2015

(65) Prior Publication Data
US 2016/0349717 A1 Dec. 1, 2016

(30) Foreign Application Priority Data
Jan. 30, 2014 (JP) .................................. 2014-016233

(51) Int. Cl.
*G05B 5/01* (2006.01)
*H02J 3/01* (2006.01)
(Continued)

(52) U.S. Cl.
CPC ............. *G05B 13/045* (2013.01); *G05B 5/01* (2013.01); *G05B 13/0265* (2013.01); *H02J 3/01* (2013.01); *Y02E 40/40* (2013.01)

(58) Field of Classification Search
CPC ........ H02J 3/01; G05B 13/0265; G05B 13/04; G05B 13/045; Y02E 40/40
(Continued)

(56) References Cited

U.S. PATENT DOCUMENTS 5,063,532 A * 11/1991 Takeda ...................... H02J 3/02
363/41
5,138,247 A * 8/1992 Tanoue ...................... H02J 3/01
323/207
(Continued)

FOREIGN PATENT DOCUMENTS

JP 6-197578 A 7/1994
JP 11-285283 A 10/1999
(Continued)

OTHER PUBLICATIONS

MathIsFun "Negative Exponents" retrieved from <https://www.mathsisfun.com/algebra/negative-exponents.html> on Nov. 13, 2018 (Year : 2018).*
(Continued)

*Primary Examiner* — Jason D Mitchell
(74) *Attorney, Agent, or Firm* — Foley & Lardner LLP

(57) ABSTRACT

A periodic disturbance suppressing control apparatus is designed to estimate and correct an inverse model of a transfer characteristic of a real system successively even in case of large condition change in the real system, and to realize a stable control system.

A periodic disturbance of an object to be suppressed is outputted as a sensed periodic disturbance ISdn, ISqn of a direct current component. A difference between a signal obtained by multiplication of the sensed periodic disturbance ISdn, ISqn with a multiplier using a reciprocal Qn of a transfer characteristic, and a signal obtained by adding only a detection delay to a periodic disturbance suppressing command I*dn, I*qn, to estimate the periodic disturbance (Continued)

$dÎ_{dn}$, $dÎ_{qn}$. Thee periodic disturbance suppressing command is calculated by calculating a deviation between the estimated periodic disturbance $dÎ_{dn}$, $dÎ_{qn}$. A learning control section 29 corrects the reciprocal Qn of the transfer characteristic in accordance with a quantity obtained by diving a difference of the periodic disturbance suppressing command $I*_{dn}$, $I*_{qn}$ during one sample interval by a difference of the sensed periodic disturbance during the one sample interval.

18 Claims, 8 Drawing Sheets

(51) Int. Cl.
    *G05B 13/04*    (2006.01)
    *G05B 13/02*    (2006.01)

(58) Field of Classification Search
    USPC .......................................................... 700/47
    See application file for complete search history.

(56) References Cited

U.S. PATENT DOCUMENTS

| | | | | |
|---|---|---|---|---|
| 5,296,764 A * | 3/1994 | Asplund | ................... | H02J 3/01 |
| | | | | 327/553 |
| 5,309,353 A * | 5/1994 | Schauder | ............... | G05B 11/40 |
| | | | | 318/798 |
| 5,489,829 A | 2/1996 | Umida | | |
| 5,726,504 A * | 3/1998 | Pecukonis | ................ | H02J 3/01 |
| | | | | 307/105 |
| 5,742,103 A * | 4/1998 | Ashok | ................ | H01R 13/6675 |
| | | | | 307/105 |
| 5,793,623 A * | 8/1998 | Kawashima | ........ | H02M 1/4225 |
| | | | | 363/36 |
| 6,311,049 B1 * | 10/2001 | Yoshizawa | ........... | H03G 3/3052 |
| | | | | 342/380 |
| 8,971,066 B2 | 3/2015 | Oi et al. | | |
| 2007/0285079 A1 * | 12/2007 | Nasle | ................... | G06F 17/5009 |
| | | | | 324/76.22 |
| 2008/0094020 A1 * | 4/2008 | Garlow | ................... | H02M 1/12 |
| | | | | 318/611 |
| 2011/0071695 A1 * | 3/2011 | Kouroussis | ........... | H02J 3/1892 |
| | | | | 700/295 |
| 2012/0191439 A1 * | 7/2012 | Meagher | ................ | G06Q 50/00 |
| | | | | 703/18 |
| 2013/0076293 A1 * | 3/2013 | Chen | ......................... | H02J 3/01 |
| | | | | 318/729 |
| 2014/0039694 A1 | 2/2014 | Yamaguchi et al. | | |
| 2015/0207433 A1 * | 7/2015 | Liu | ......................... | H02M 1/40 |
| | | | | 363/132 |
| 2015/0326163 A1 | 11/2015 | Yamaguchi et al. | | |
| 2016/0079758 A1 * | 3/2016 | Pan | ......................... | H02J 3/383 |
| | | | | 307/82 |
| 2016/0344185 A1 * | 11/2016 | Hashimoto | ............... | H02J 3/01 |

FOREIGN PATENT DOCUMENTS

| | | |
|---|---|---|
| JP | 2012-55148 A | 3/2012 |
| JP | 2012-226411 A | 11/2012 |
| JP | 2014-115746 A | 6/2014 |

OTHER PUBLICATIONS

Yugo Tadano et al., Jido Gakushu Kino o Yusuru Shuki Gairan Yokusei Seigyo Gijutsu, Meiden Jiho, No. 4, Oct. 25, 2013, pp. 53-60.

\* cited by examiner

PERIODIC EXTERNAL DISTURBANCE SUPPRESSION CONTROL DEVICE

TECHNICAL FIELD

The present invention relates to suppression of periodic disturbance with a periodic disturbance observer with learning function, and more specifically to periodic disturbance suppression control realizing a stable control system even in case of large condition change in an actual system or real system.

BACKGROUND ART

Recently, the utilization of dispersed power system with smart grid, microgrid and new energy such as solar power and wind power is gathering attention, and further spread and expansion are expected. With this trend, the number of loads generating harmonics and the number of interconnected units of semiconductor power conversion systems are increasing, and hence there is concern over harmonics problem in the power distribution system. Since harmonics exert adverse influence on other interconnected devices, the harmonics are controlled and stipulated by harmonic guidelines etc. and various measures are taken to harmonics interference problem by using power active filters or other means.

However, conventional measures and methods might become insufficient from the viewpoint of harmonics compensation effect and control stability because the interconnection of many unspecified dispersed power sources everywhere could cause various problems such as increase of accumulated harmonics, complication of sources of harmonics, fluctuation of system impedance and load impedance with change in the construction of the distribution system, changeover of a phase advancing capacitor, and operating condition, and variation of system resonance characteristics.

As to the application and operation of active filters, adjusting operations are required to adjust control parameters on the spot and, moreover, operations are required for readjustment in case of change in the operating situation.

Based on the above-mentioned background, Patent Document 1 discloses a technique expanding a generalized periodic disturbance compensating method using the complex vector notation, proposed by the inventor of the present application et al., and correcting, by learning, the reciprocal of the transfer characteristic of the observer real system from information on complex vector loci of the periodic disturbance. The technique of Patent Document 1 is configured to extract a harmonic frequency component of each order in a power system active filter control system for controlling a system current as the object of control, automatically learning a frequency transfer function (taking account of dead times of sensors and control calculations and impedance characteristics collectively) from the harmonic suppressing command of each order to the sensed harmonic, and estimating and suppressing the current including the periodic disturbance in the form of harmonic. With this technique, it is possible to construct a robust power active filter control system eliminating the need for preparatory system identification.

PRIOR ART DOCUMENTS

Patent Document

Patent Document 1: JP2012-55148A

SUMMARY OF THE INVENTION

The technique of correcting the reciprocal $Q_n$ of the transfer characteristic in Patent Document 1 enables a correction (learning correction) to correct the model (parameter) error of the periodic disturbance observer, in a manner following condition change of the real system. However, this technique does not take divergence condition of harmonic and stagnation of harmonic change into consideration. Therefore, when the condition change of the real system is great, the stability and convergence become problematical outside the range of the robust stability condition from the relationship (FIG. 16) of the amplitude error $A_n$ and phase error $\phi_n$ of the inverse model $Q\hat{}_n$. Moreover, as expressed by the expression (10), in the range of amplitude error $A_n<1$, the response of the learning correction becomes problematical in dependence on the characteristic of amplitude error $A_n$.

Therefore, a task is to correct an inverse model of a transfer characteristic of a real system successively during estimation even in case of large condition change in the real system in a periodic disturbance suppressing control apparatus and thereby to realize a stable control system.

The present invention has been devised in view of the above-mentioned problem. According to one aspect of the present invention, a periodic disturbance suppressing control apparatus comprises: a periodic disturbance sensing section to sense a periodic disturbance of a controlled object as a sensed periodic disturbance in a form of a direct current component; a periodic disturbance estimating section to estimate the periodic disturbance by determining a difference between a signal obtained by multiplication of the sensed periodic disturbance with a multiplier using a reciprocal of a transfer characteristic from a periodic disturbance suppressing command to the sensed periodic disturbance, determined according to a transfer characteristic of a control system, and a signal obtained by adding only a detection delay to the periodic disturbance suppressing command; an adder to calculate the periodic disturbance suppressing command by calculating a deviation between an estimated periodic disturbance estimated by the periodic disturbance estimating section and a periodic disturbance command to suppress a disturbance; and a learning control section to correct the reciprocal of the transfer characteristic in accordance with a quantity obtained by diving a difference of the periodic disturbance suppressing command during one sample interval by a difference of the sensed periodic disturbance during the one sample interval.

According to another aspect, the periodic disturbance suppressing apparatus is arranged to suppress the periodic disturbance by superposing the periodic disturbance suppressing command on a command of a power conversion device connected with a system bus of a power source.

According to still another aspect, the learning control section is configured to use average or mean values during an interval of a control period of a periodic disturbance observer, as the sensed periodic disturbance and the period disturbance suppressing command.

According to still another aspect, the learning control section is configured to stop a learning control and output the reciprocal of the transfer characteristic just before stoppage when the difference during a one sample interval in an average value of the sensed periodic disturbance is lower than or equal to a threshold value.

Furthermore, the learning control section may be arranged to deliver an output through a filter.

Furthermore, the control apparatus may further comprise a limiter to limit an amplitude of the periodic disturbance suppressing command.

Furthermore, a plurality of the periodic disturbance control apparatus may be arranged in parallel to suppress periodic disturbance of a plurality of orders.

According to the present invention, in the periodic disturbance suppressing control apparatus, it is possible to correct the inverse model of the transfer characteristic of the real system successively during estimation even in case of large condition change in the real system in the periodic disturbance suppressing control apparatus and thereby to realize a stable control system.

MODE(S) FOR CARRYING OUT THE INVENTION

Figure 11:
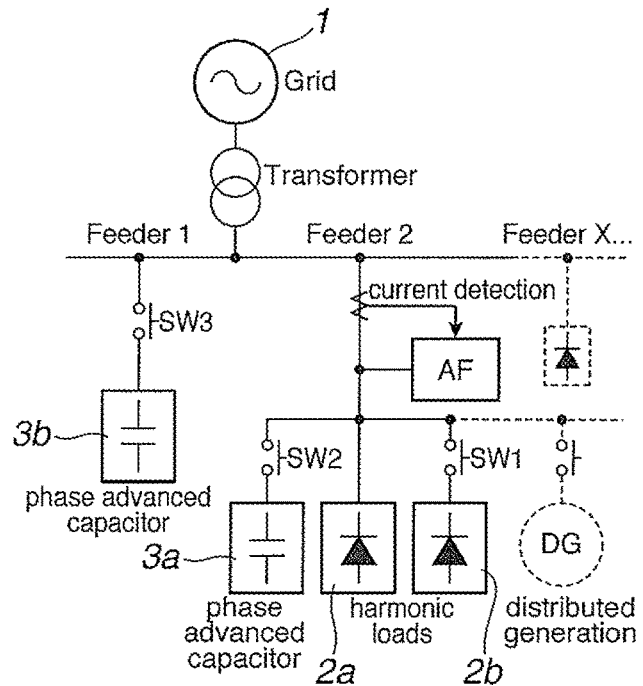
FIG. 11 is a concept view showing one example of a power distribution system.

FIG. 11 is a conceptual view showing an existing typical power distribution system. A power distribution network is arranged to supply power from a system power supply 1 to demanders or users Feeder1, Feeder2, . . . and FeederX. In this power distribution network, there is provided a shunt active filter AF of a source current detection type, at a power receiving point of the demander Feeder2 who is a large demander in the figure.

In the demander Feeder2, there are harmonics sources (harmonic loads) 2a and 2b. A switch SW1 is a switch for supposing the fluctuation of a harmonic load current and a switch SW2 is a switch for supposing the fluctuation of load impedance due to changeover of a phase advanced capacitor 3a. Moreover, in order to take account of system impedance fluctuation of demander Feeder2 as viewed from active filter AF and influence of other demanders, the changeover of phase advanced capacitor 3b is supposed with a switch SW3 of the demander Feeder1.

Figure 12:
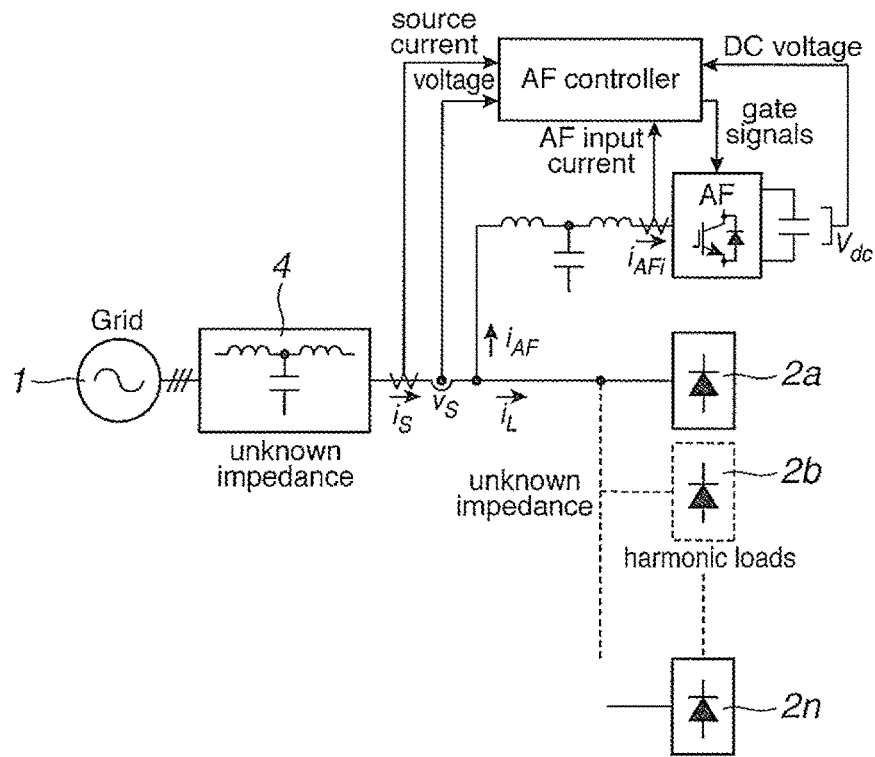
FIG. 12 is a circuit diagram showing a control model of a source current detecting type shunt active filter.

FIG. 12 shows the circuit configuration of a control model of the source current detection type shunt active filter AF and an example of a control device. Impedances of an actual or real system 4 and loads 2a, 2b, . . . 2n (n is a natural number) are unknown and the quantity of harmonics generation is varied with load variation.

As shown in FIG. 12, following symbols are used: a voltage Vs of a system interconnection point; a current $i_s$ of the system interconnection point; an active filter current $i_{AF}$; an active filter input current $i_{AFi}$; an active filter dc voltage Vdc; and a load current (total) $i_L$. The inside of the active filter control system is explained later.

Instead of detection of current $i_s$ at the system interconnection point, it is possible to employ a configuration to detect the active filter input current $i_{AFi}$ and the load current (total) $i_L$, and to determine a current corresponding to the interconnection point current $i_s$ by addition in a controller.

In the distribution system, the orders of harmonics exceeding the guideline level and causing problems are limited to certain orders such as fifth and seventh. Therefore, a frequency component of each of the specified orders is extracted and compensation is made for each order.

Figure 13:
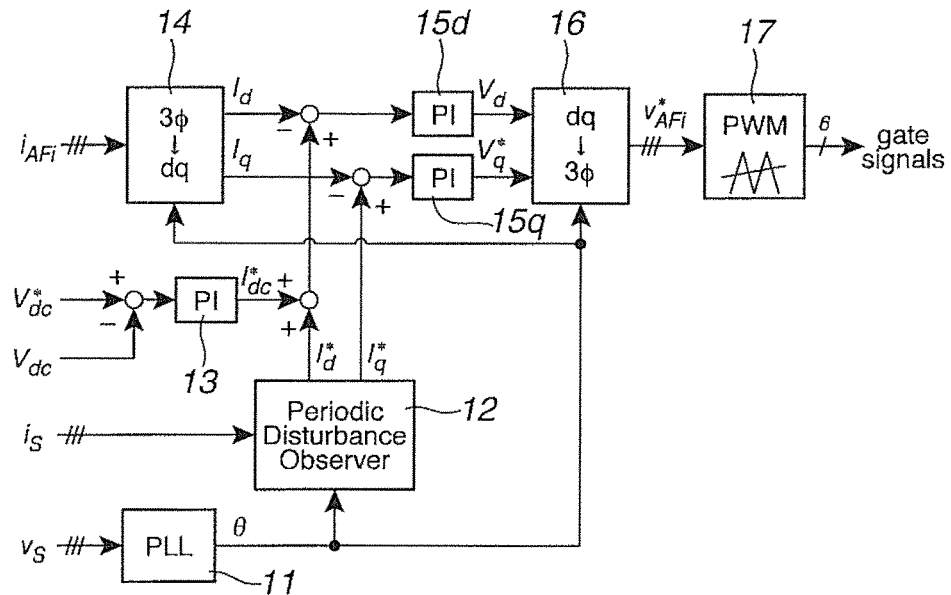
FIG. 13 is a basic block diagram of an active filter control system.

FIG. 13 shows a basic configuration of an active filter control system as one example of an embodiment 1.

First, an AC voltage phase θ is detected from the interconnection point voltage Vs by a PLL (Phase Locked Loop) 11. A dq axes orthogonal rotating coordinate system is constructed in synchronization with the AC voltage phase θ as a reference phase, and a current vector control is performed on the d and q axes.

A later-mentioned periodic disturbance observer (periodic disturbance suppression control apparatus) 12 produces d axis command current value I*d and q axis command current value I*q of a periodic disturbance suppressing current command. A current I*dc for controlling the active filter DC voltage Vdc constant is added to the d axis command current I*d. The constant control of active filter DC voltage Vdc is performed with a PI controller 13, to follow an active filter DC command voltage V*dc.

A sensed value of the active filter input current $i_{AFi}$ is converted into a d axis sensed current Id and a q axis sensed current Iq, with a dq rotating coordinate transforming section 14 synchronous with the frequency component of the AC voltage phase θ. The control system determines a deviation of the d axis sensed current Id from the d axis command current I*d and a deviation of the q axis sensed current Iq from the q axis command current I*q, and produces a d axis command voltage V*d and a q axis command voltage V*q, with PI controllers 15d and 15q, respectively. These command voltages are converted into a 3-phase voltage command V*$_{AFi}$ based on the AC voltage phase θ, with a dq rotating axis inverse transforming section 16. A comparator 17 compares the amplitude of the 3-phase voltage command V*$_{AFi}$ serving as the fundamental or fundamental wave, and the amplitude of the carrier signal, and thereby produces gate control signals of a PWM controller.

Figure 14:
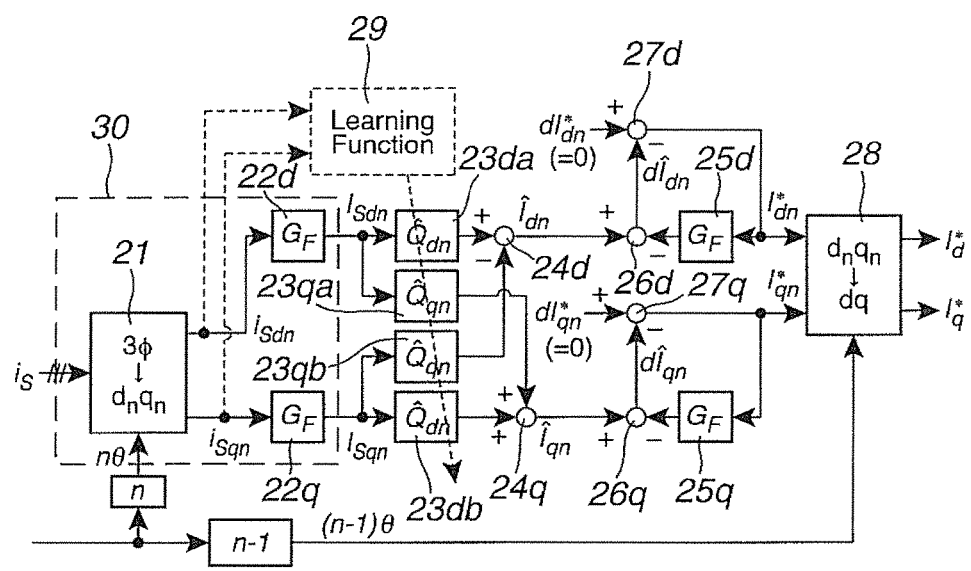
FIG. 14 is a control block diagram showing a periodic disturbance observer to a harmonic of n-th order frequency component.

FIG. 14 is a control block diagram showing a control configuration of the periodic disturbance observer 12 for a harmonic of n-th frequency component. To extract the n-th harmonic in the $d_n q_n$ coordinate axes synchronous with the n-th frequency component, a dq rotating coordinate transforming section 21 converts the sensed 3-phase interconnection point current (the sensed value of the input signal) $i_s (=[i_{Su}\ i_{Sv}\ i_{Sw}]^T)$, to a $d_n$ axis sensed current $i_{Sdn}$ and a $q_n$ axis sensed current $i_{Sqn}$ in the nth $d_n q_n$ rotating coordinates, by a $d_n q_n$ coordinate transforming equation given by an expression (1).

[Math. 1]

$$\begin{bmatrix} i_{Sdn} \\ i_{Sqn} \end{bmatrix} = \sqrt{\frac{2}{3}} \begin{bmatrix} \cos n\theta & \cos\left(n\theta - \frac{2}{3}\pi\right) & \cos\left(n\theta + \frac{2}{3}\pi\right) \\ -\sin n\theta & -\sin\left(n\theta - \frac{2}{3}\pi\right) & -\sin\left(n\theta - \frac{2}{3}\pi\right) \end{bmatrix} \begin{bmatrix} i_{Su} \\ i_{Sv} \\ i_{Sw} \end{bmatrix} \quad (1)$$

In the $d_n$ axis sensed current $i_{Sdn}$ and $q_n$ axis sensed current $i_{Sqn}$, the n-th order component extracted as a specified order appears as DC component, and frequency components other than the n-th order appear as fluctuation component. Therefore, respectively, through LPFs (Low-Pass Filters) 22d and 22q represented by an expression (2), the control system extracts the $d_n$ axis current $I_{Sdn}$ and $q_n$ axis current $I_{Sqn}$ which are sensed periodic disturbance currents of the DC components synchronous with the $d_n q_n$ rotating coordinates. Since the expression (2) is a simplest example of LPF advantageous for simplicity in calculation, it is possible to change the order and form in dependence on conditions such as noise at the time of extraction of pulsating component. Alternatively, it is possible to use Fourier transform. The dq rotating coordinate transforming section 21 and LPFs 22d and 22q constitute a periodic disturbance sensing section 30.

[Math. 2]

$$G_F(s) = \frac{w_f}{s + w_f} \quad (2)$$

wf: cutoff frequency, s: Laplace operator.

The periodic disturbance observer 12 forms the control system contributing only to the specific frequency component. Therefore, a transfer characteristic $P_n$ of the real system or actual system of the $d_n q_n$ coordinate axes for the n-th component can be expressed, as an expression (3), in the form of a one dimensional complex vector having a do axis component $P_{dn}$ in a real part and a $q_n$ axis component $P_{qn}$ in an imaginary part.

[Math. 3]

$$P_n = P_{dn} + jP_{qn} \quad (3)$$

The transfer characteristic $P_n$ of the real system stands for a frequency transfer characteristic from a periodic disturbance suppressing command current $I^*_n (=I^*_{dn}+jI^*_{qn})$ at the nth order of the periodic disturbance observer 12, to the periodic disturbance sensed current (sensed value of the input signal) $i_{Sn} (=i_{Sdn}+ji_{Sqn})$, and takes the generalized form including not only the impedance characteristic of the controlled object, but also the inverter control characteristic, computation delay, dead time, delay of the current detection, other disturbances of circuit characteristic, and transfer characteristics of the control device and peripheral devices (such as sensors) relating to the control.

Figure 15:
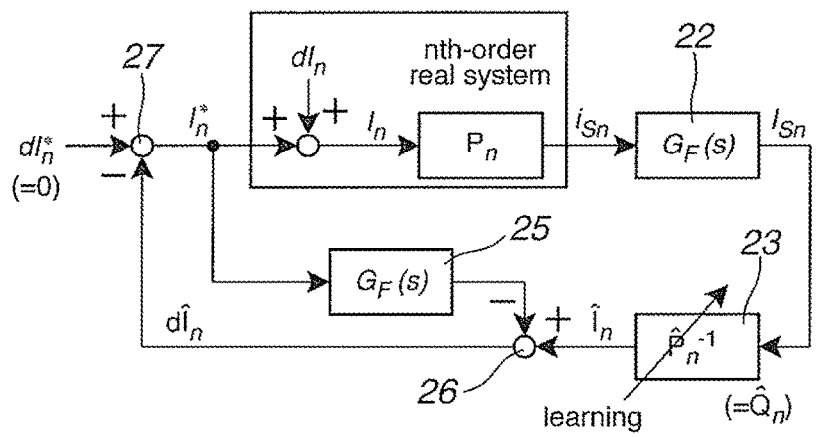
FIG. 15 is a diagram showing a control system of the periodic disturbance observer, focusing only on the n-th order frequency component of the $d_n q_n$ coordinates.

To explain the operation of periodic disturbance observer 12 briefly, a control system focusing only on the nth frequency component of the $d_n q_n$ coordinate axes is expressed as shown in FIG. 15. In FIG. 15, the vector notation means the complex vector. $G_F(s)$ given by the expression (2) is LPF acting on each of the real part and imaginary part components.

The basic operation is an operation to estimate an real system input current $\hat{I}_n (=\hat{I}_{dn}+j\hat{I}_{qn})$ as expressed by an expression (5) with a multiplier 23, from the period disturbance sensed current $I_{Sn} (=I_{Sdn}+jI_{Sqn})$ from LPF 22, by the use of a model $\hat{Q}_n (=\hat{P}_n^{-1})$ of a reciprocal $Q_n$ of the transfer characteristic of the real system expressed by an expression (4).

[Math. 4]

$$\hat{Q}_n = \hat{Q}_{dn} + j\hat{Q}_{qn} = \frac{1}{\hat{P}_{dn} + j\hat{P}_{qn}} \quad (4)$$

$$\therefore \hat{Q}_{dn} = \frac{\hat{P}_{dn}}{\hat{P}_{dn}^2 + \hat{P}_{qn}^2}, \hat{Q}_{qn} = -\frac{\hat{P}_{dn}}{\hat{P}_{dn}^2 + \hat{P}_{qn}^2}$$

$$\hat{I}_n = \hat{Q}_n I_{Sn} \quad (5)$$

Since the periodic disturbance current $dI_n$ is included in the real system input current $\hat{I}_n$, an estimated periodic disturbance current $d\hat{I}_n (=d\hat{I}_{dn}+jd\hat{I}_{qn})$ is determined by subtracting the periodic disturbance suppressing command current $I^*_n (=I^*_{dn}+jI^*_{qn})$ obtained through $G_F(s)$ 25, from the estimated real system input current $\hat{I}_n$ of the equation (5), with an adder 26 as expressed by an expression (6).

[Math. 5]

$$d\hat{I}_n = \hat{Q}_n I_{Sn} - G_F(s)I^*_n \quad (6)$$

An adder 27 can cancel out the periodic disturbance current $dI_n$ by subtracting the estimated periodic disturbance current $d\hat{I}_n$ expressed by the expression (6), from the periodic disturbance command current $dI^*_n (=dI^*_{dn}+jdI^*_{qn})$ (normally equal to zero).

The system of FIG. 14 is obtained by expanding the basic configuration of FIG. 15, for the active filter control of the $d_n q_n$ coordinate axes, and the system of FIG. 14 can provide the $d_n$ axis command current $I^*_{dn}$ and $q_n$ axis command current $I^*_{qn}$ of the periodic disturbance suppressing command current to suppress the periodic disturbance, with the learning function using the reciprocal $Q_n$ of the transfer characteristic. Specifically, multipliers 23da, 23db, 23qa and 23qb determine products of the periodic disturbance sensed currents $I_{Sdn}$ and $I_{Sqn}$ and the reciprocal $Q_{dn}+jQ_{qn}$ of the transfer characteristic of the real system, and adders 24d and 24q calculate the estimate values $\hat{I}_{dn}$ and $\hat{I}_{dq}$ of the input current of the real system by addition.

The reciprocals $Q_{dn}$ and $Q_{qn}$ of the transfer characteristics of the real system are the reciprocals of the transfer characteristics from the d axis command current $I^*_d$ and q axis command current $I^*_q$ of the periodic disturbance suppressing command current, to the sensed value (sensed input signal) is of the interconnection point current. With these reciprocals, the control system can cancel out the transfer characteristic of a phase delay etc. The reciprocals $Q_{dn}$ and $Q_{qn}$ are corrected in accordance with the sensed harmonic currents $i_{Sdn}$ and $i_{Sqn}$, by a learning control section 29. A periodic disturbance estimating section is constituted by the multipliers 23, adders 24, LPFs 25 and adders 26. The learning control section 29 will be explained later.

Next, the disturbance is estimated. The disturbance is determined by determining a deviation between two signals.

(1) A quantity ($\hat{I}_{dn}$, $\hat{I}_{qn}$) obtained by passage of the periodic disturbance suppression command currents $I^*_{dn}$ and $I^*_{qn}$ through the real system and multiplication of the reciprocals $Q_{dn}$ and $Q_{qn}$ of the transfer characteristics of the real system to cancel out the transfer characteristic of the real system.

(2) A quantity obtained by application of the periodic disturbance suppression command currents $I^*_{dn}$ and $I^*_{qn}$ to LPFs 25d and 25q, without passage through the real system.

The above-mentioned quantity (1) is the signal on which the disturbance of the real system is superimposed. The quantity (2) is the signal which results from only the application of LPFs 25d and 25q to the periodic disturbance suppression command currents $I^*_{dn}$ and $I^*_{qn}$ and which does not include the disturbance. By determining the difference between these two signals with adders 26d and 26q, the control system can determine the periodic disturbance estimated currents $d\hat{I}_{dn}$ and $d\hat{I}_{qn}$.

Adders 27d and 27q determine deviations of the thus-obtained periodic disturbance estimated currents $d\hat{I}_{dn}$ and $d\hat{I}_{qn}$ and the periodic disturbance command currents $dI^*_{dn}$ and $dI^*_{qn}$. Normally, the periodic disturbance command currents $dI^*_{dn}$ and $dI^*_{qn}$ are set to zero to control the disturbance to "0".

With this calculation, the control system determines the periodic disturbance suppressing command currents $I^*_{dn}$ and $I^*_{qn}$. The periodic disturbance suppressing command currents $I^*_{dn}$ and $I^*_{qn}$ are LPF-processed with LPFs 25d and 25q and used for the estimation of periodic disturbance estimated currents $d\hat{I}_{dn}$ and $d\hat{I}_{qn}$ by comparison with the real system estimated input currents $\hat{I}_{dn}$ and $\hat{I}_{qn}$.

The periodic disturbance suppressing command currents $I^*_{dn}$ and $I^*_{qn}$ of the $d_n q_n$ coordinate axes are converted by a dq coordinate inverse transforming section 28, into the d axis command current $I^*_d$ and q axis command current $I^*_q$ of the dq coordinate periodic disturbance suppressing command, as expressed by an equation (7), and used as the current command of the dq axes current vector control system of FIG. 13.

A signal (n−1)θ is inputted into the dq rotation coordinate inverse transforming section 28 because, by the inverse transformation at the (n−1)th order, it is possible to obtain orthogonal two axes components with the signal of n multiple of the fundamental being DC value.

[Math. 6]

$$\begin{bmatrix} I^*_d \\ I^*_q \end{bmatrix} = \begin{bmatrix} \cos\{(n-1)\theta\} & -\sin\{(n-1)\theta\} \\ \sin\{(n-1)\theta\} & \cos\{(n-1)\theta\} \end{bmatrix} \cdot \begin{bmatrix} I^*_{dn} \\ I^*_{qn} \end{bmatrix} \quad (7)$$

[Influence of Model Error]

Next, influence of model error is examined.

Actual power systems involve fluctuation such as impedance fluctuation, and hence, the transfer characteristic Pn of the real system becomes a time-varying parameter. Therefore, consideration is given to influence of a model error $\hat{Q}n \neq Qn$ of the reciprocal of the transfer characteristic Pn of the real system, on the stability of periodic disturbance observer 12.

In the control system of the $d_n q_n$ rotation coordinates shown in FIG. 15, a disturbance response transfer function from the periodic disturbance to the sensed value is given by an equation (8). However, an ideal condition is set by removing the other frequency components with LPF of the equation (2).

[Math. 7]

$$\frac{I_{Sn}}{dI_n} = \frac{w_f P_n s}{s^2 + w_f(1 + P_n \hat{Q}_n)s + w_f^2 P_n \hat{Q}_n} \quad (8)$$

$I_{Sn}$: sensed current
$d_{In}$: periodic disturbance current
$w_f$: cutoff frequency An inverse model $\hat{Q}n$ of the reciprocal Qn ($=P^{-1}n$) of the transfer characteristic of the real system is defined as an expression (9) by using an amplitude error An (An>0) in the inverse model, and a phase error φn (−π<φn≤π). When the amplitude error An=1 and the phase error φn=0, the inverse model $\hat{Q}$ is equal to a true value.

[Math. 8]

$$\hat{Q}_n = A_n e^{j\phi_n} Q_n \quad (9)$$

An expression (10) is obtained by substituting expression (9) in expression (8) and rearranging. In this equation, Cn(s) is a periodic disturbance response transfer characteristic.

[Math. 9]

$$\frac{I_{Sn}}{dI_n} = \frac{w_f s}{(s + w_f)(s + w_f A_n e^{j\phi_n})} P_n = C_n(s) P_n \quad (10)$$

From a condition of $-w_f<0, -w_f A_n \cos\phi_n<0$ where the real part of the pole of Cn(s) is negative, a robust stability condition to the phase error $\phi_n$ is given by an expression (11).

[Math. 10]

$$-\frac{\pi}{2} < \phi_n < \frac{\pi}{2} \quad (11)$$

Since An>0, the amplitude error does not affect the stability condition in a continuous system. However, the pole is shifted to the stable direction as the amplitude error An become larger instead of the true value An=1. Although a dominant pole in An>1 is determined by the cutoff frequency $w_f$ of LPF, the control with An>1 is possible as a kind of observer gain to improve the quickness of the response. However, the robust stability condition is considered with a transfer function of an equation (12) in a discrete system because there is a need for avoiding a calculation dead time and algebraic loop accompanied by the digital control.

[Math 11]

$$C_n(z^{-1}) = \frac{z^{-1} G_F(z^{-1})(1 - z^{-1} G_F(z^{-1}))}{1 + (A_n e^{j\phi_n} - 1)z^{-1} G_F(z^{-1})} \quad (12)$$

An expression (14) is obtained by bilinear transformation of GF(s) of expression (2) with the calculation period Ts as expressed by an expression (13), and substitution in equation (12) to solve a characteristic equation.

[Math. 12]

$$G_F(z^{-1}) = \frac{w_f T_S(1+z^{-1})}{2 + w_f T_S + (w_f T_S - 2)z^{-1}} \quad (13)$$

$$\begin{cases} z = 0 \\ z = \frac{2 - w_f T_S}{2 + w_f T_S} \\ z = \frac{2 - w_f T_S A_n e^{j\phi_n} \pm \sqrt{(w_f T_S A_n e^{j\phi_n} - 2)^2 - 4w_f T_S(2 + w_f T_S)(A_n e^{j\phi_n} - 1)}}{2(2 + w_f T_S)} \end{cases} \quad (14)$$

Figure 16:
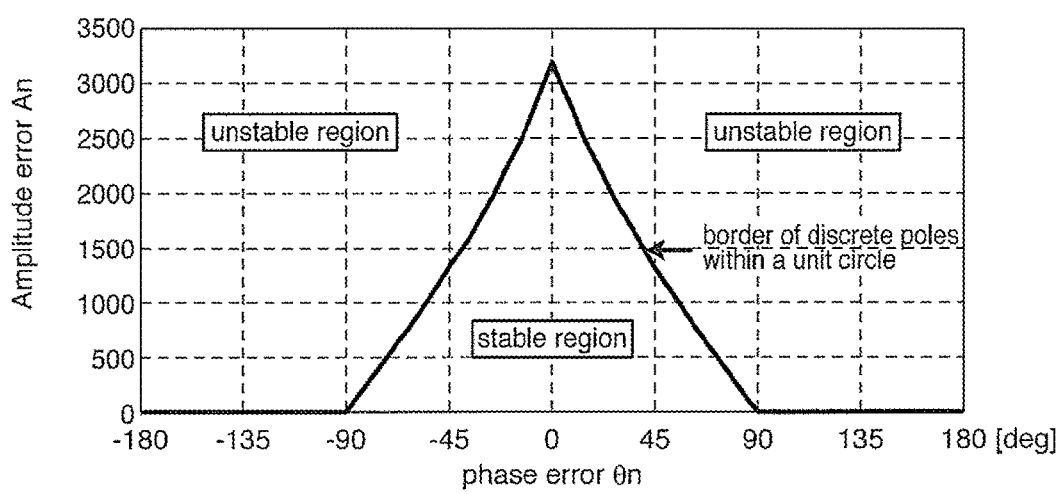
FIG. 16 is a graphic view showing stability boundary condition of model error.

Although stability is achieved if all the poles of the discrete system of expression (14) are disposed within a unit circle, it is difficult to find an algebraic solution. Accordingly, a stable boundary condition shown in FIG. 16 is obtained by determining a robust stability numerically to the amplitude error An and phase error φn with the setting of cutoff frequency wf=2π[rad/s], and calculation period Ts=100 [μs], for example.

When the phase error φn is null, the stability margin to amplitude error An is greatest. The stability decreases with increase of the phase error φn, and the system becomes unstable outside the range of expression (11). Within a stable region, it is possible to improve the quickness of the response of the periodic disturbance suppression by increasing amplitude error An. However, in the actual use, it is required to consider model error fluctuation due to system impedance fluctuation, and to determine the setting with a sufficient stability margin.

The following explanation is directed to embodiments arranged to correct and control the error between the control form of the real system and the periodic disturbance observer sequentially with an observer inverse model, in an example using an active filter AF.

In this description, the explanation takes, as a typical example, a source current detection type shunt active filter AF for a power distribution system. However, the control technique can be applied to other apparatus and configurations in similar manners. For example, the technique can be used for load current detection type active filter AF or voltage detection type active filter AF, or a periodic disturbance suppressing control apparatus for correcting distortion of source voltage instead of distortion of current distortion.

Embodiment 1

The learning control explained in a first embodiment (correction control of inverse model Q^n following condition change of the real system) is auxiliary function intended to prevent degradation of control performance and destabilization of the periodic disturbance observer 12. Therefore, this learning control does not require high speed calculation as compared to the control period or cycle of the harmonic suppression control. For example, the learning control period $T_L$ is set at $T_L$=20 [ms] (50 Hz system fundamental period), as compared to the calculation period Ts of the periodic disturbance observer 12 set at Ts=100 [μs], in consideration of the calculation load of harmonic vector loci.

Next, the explanation is directed to a method of estimating a transfer characteristic Pn of the real system at the learning control period $T_L$. The transfer characteristic Pn of the real system in the first embodiment is a n-th order component (n is an arbitrary order) of the frequency transfer characteristic from a harmonic suppressing command I*n (=I*dn+jI*qn) of the periodic disturbance observer to a harmonic sensed current (the sensed value of input signal) $i_{Sn}$(=$i_{Sdn}$+ji$_{Sqn}$).

In the following explanation, consideration is given to various values of an N-th sample sampled with the learning control period $T_L$ and various values of a previous sample (N−1) taken one sample before. A suffix [N] represents values of the Nth sample, and a suffix [N−1] represents values of the previous sample taken one sample ago.

Figure 1:
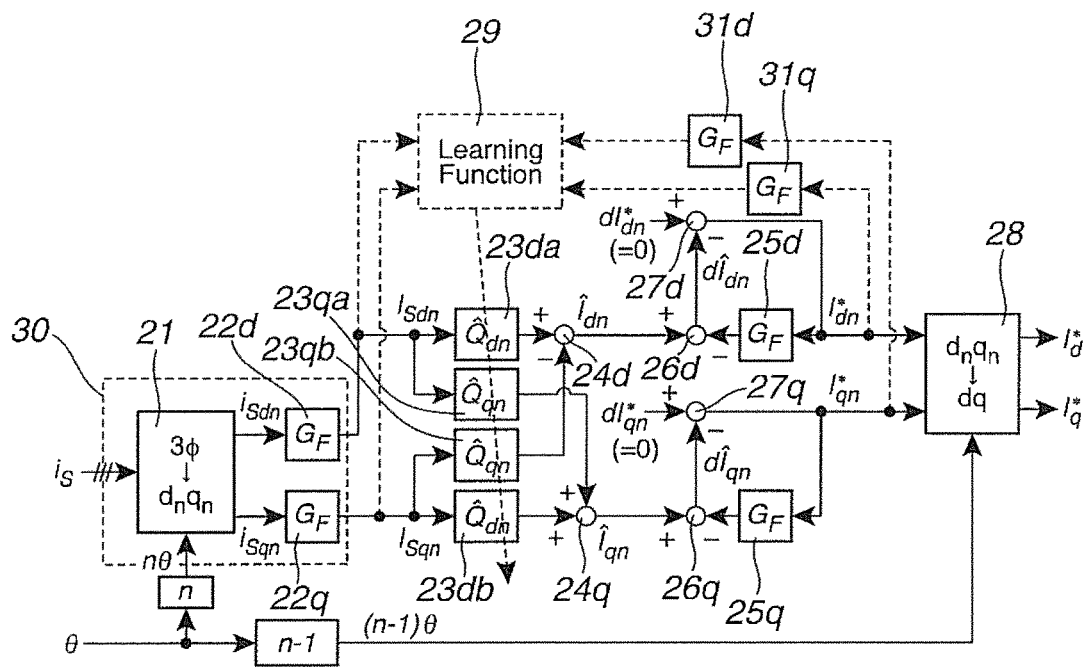
FIG. 1 is a control block diagram showing a periodic disturbance observer to harmonic of an n-th order frequency component according to a first embodiment.

FIG. 1 is a block diagram showing the periodic disturbance observer provided with a learning function. First, the input-output relationship of the real system shown in FIG. 15 is given by an expression (15) for each sample.

[Math. 13]

$$\begin{cases} I_{Sn[N]} = G_F(z^{-1}_{[n]}) \cdot P_{n[N]}(I^*_{n[N]} + dI_{n[N]}) \\ I_{Sn[N-1]} = G_F(z^{-1}_{[N-1]}) \cdot P_{n[N-1]}(I^*_{n[N-1]} + dI_{n[N-1]}) \end{cases} \quad (15)$$

A following expression defines a difference ΔPn[N] of the transfer characteristic of the real system during one sample interval of the learning control period $T_L$, a difference ΔdIn[N] of the periodic disturbance current during one sample interval, a difference ΔI*n[N] of the harmonic suppressing command current during one sample interval, and a difference ΔISn[N] of the harmonic sensed current during one sample interval.

[Math. 14]

$$\begin{cases} \Delta I_{Sn[N]} = I_{Sn[N]} - I_{Sn[N-1]} \\ \Delta I^*_{n[N]} = G_F(z^{-1}_{[N]}) \cdot I^*_{n[N]} - G_F(z^{-1}_{n[N-1]}) \cdot I^*_{n[N-1]} \\ \Delta P_{n[N]} = P_{n[N]} - P_{n[N-1]} \\ \Delta dI_{n[N]} = dI_{n[N]} - dI_{n[N-1]} \end{cases} \quad (16)$$

From the expressions (15) and (16), a following relationship is obtained as to the differences between consecutive samples.

[Math. 15]

$$\Delta I_{Sn[N]} = P_{n[N]}(\Delta I^*_{n[N]} + (G_F(z^{-1}_{[N]}) - G_F(z^{-1}_{[N-1]})) \cdot \Delta dI_{n[N]}) + \quad (17)$$
$$\Delta P_{n[N]}(G_F(z^{-1}_{[N]}) \cdot I^*_{n[N]} - \Delta I^*_{n[N]} + G_F(z^{-1}_{[N-1]}) \cdot \Delta dI_{n[N]}) +$$
$$\Delta dI_{n[N]} \cdot G_F(z^{-1}_{[N-1]}) \cdot P_{n[N]} - \Delta P_{n[N]})$$

The first embodiment is intended to suppress the harmonics of the power system. In general, the variation of the harmonic characteristic and the variation of the system impedance are gradual in the power system, and the variations are very small during a very short time interval of the learning control period $T_L$=20 ms.

Therefore, an expression (18) is obtained by regarding the difference (variation) ΔPn[N] of the transfer characteristic of the real system and the difference (variation) ΔdIn[N] of the periodic disturbance current during one sample interval of the learning control period $T_L$ (the N-th sample–the (N−1)th sample) in the expression (17) as being equal to zero and neglecting these differences. Moreover, the LPF of the N-th sample and the LPF of the (N−1)th sample are regarded as $GF(z^{-1}_{[N]})=GF(z^{-1}_{[N-1]})$.

[Math. 16]

$$\Delta I_{Sn[N]} \cong P_{n[N]} \Delta I^*_{n[N]} \tag{18}$$

From the expression (18), the estimated value P^n[N] of the transfer characteristic of the rear system to the n-th order harmonic of the N-th sample is estimated as an expression (19).

[Math. 17]

$$\hat{P}_{n[N]} \cong \frac{\Delta I_{Sn[N]}}{\Delta I^*_{n[N]}} \tag{19}$$

Therefore, the inverse model $\hat{Q}n$ ($=\hat{P}^{-1}n$) of the periodic disturbance 12 for the n-th order harmonic of the N-th sample is given by an expression (20).

[Math. 18]

$$\hat{Q}_{n[N]} \cong \frac{\Delta I^*_{n[N]}}{\Delta I_{Sn[N]}} \tag{20}$$

An expression or equation (21) is obtained by expanding Expression (20) with the $d_n q_n$ rotating coordinate system.

[Math. 19]

$$\begin{cases} \hat{Q}_{dn[N]} = \dfrac{(I_{Sdn[N]} - I_{Sdn[N-1]})(I^*_{dn[N]} - I^*_{dn[N-1]}) + (I_{Sqn[N]} - I_{Sqn[N-1]})(I^*_{qn[N]} - I^*_{qn[N-1]})}{(I_{Sdn[N]} - I_{Sdn[N-1]})^2 + (I_{Sqn[N]} - I_{Sqn[N-1]})^2} \\ \hat{Q}_{qn[N]} = \dfrac{(I_{Sdn[N]} - I_{Sdn[N-1]})(I^*_{qn[N]} - I^*_{qn[N-1]}) + (I_{Sqn[N]} - I_{Sqn[N-1]})(I^*_{dn[N]} - I^*_{dn[N-1]})}{(I_{Sdn[N]} - I_{Sdn[N-1]})^2 + (I_{Sqn[N]} - I_{Sqn[N-1]})^2} \end{cases} \tag{21}$$

Figure 2:
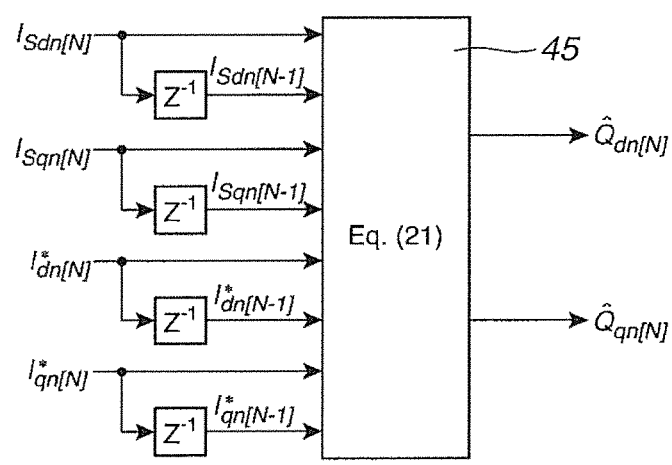
FIG. 2 is a block diagram showing a learning control section according to the first embodiment.

FIG. 2 is a block diagram of the learning control section 29 shown in FIG. 1. The current sample values $I_{Sdn[N]}$ and $I_{Sqn[N]}$ of the d axis and q axis n-th order sensed periodic disturbances and the current sample values $I^*_{dn[N]}$ and $I^*_{qn[N]}$ of the d axis and q axis n-th order harmonic suppressing command currents, and the previous sample values $I_{Sdn[N-1]}$, $I_{Sqn[N-1]}$, $I^*_{dn[N-1]}$ and $I^*_{qn[N-1]}$ obtained through delay circuits $Z^{-1}$ are substituted in the inverse model estimating expression of the N-th sample d axis and q axis n-th order harmonic, expressed by the expression or equation (21). The estimated inverse models $\hat{Q}_{dn[N]}$ and $\hat{Q}_{qn[N]}$ are applied to the multipliers 23da, 23db, 23qa and 23qb of periodic disturbance observer 12 successively.

According to the first embodiment, even in case of a large condition change in the real system and an error between the transfer characteristic Pn of the real system and the model of periodic disturbance observer 12, the control system can follow the condition change and correct the inverse models $\hat{Q}_{dn[N]}$ and $\hat{Q}_{qn[N]}$ of the transfer characteristic of the real system during estimation, so that the first embodiment can realize the very stable control system. Moreover, even if the power system impedance that is the controlled object to be controlled has been changed during the harmonic suppressing control, the control system according to the first embodiment can immediately correct the inverse models $\hat{Q}_{dn[N]}$ and $\hat{Q}_{qn[N]}$ of the transfer characteristic of the real system properly and continue the harmonic suppressing operation automatically.

As explained above, in addition to the robust stability of the base control configuration in the form of the periodic disturbance observer 12, the first embodiment makes it possible to achieve the stability in all the operating regions by correcting the model of the periodic disturbance observer 12 automatically even if the transfer characteristic Pn of the real system is varied and the operation is brought into the region outside the robust stability region.

Accordingly, it is possible to eliminate the need for identification of the power system in advance even if the power system impedance is unknown, to facilitate the maintenance and to automatize the control adjustment.

Embodiment 2

In the first embodiment, the pulsation frequency component ISn extracted through LPF GF(s) of the expression (2) is substituted, as the harmonic sensed current, into the inverse model estimating equation (21) in the N-th sample, d axis and q axis n-th order harmonic. A response delay is involved in LPF GF(s), and therefore, the estimation of the expression (21) is delayed with respect to the variation of transfer characteristic Pn of the real system. Therefore, the second embodiment uses an average harmonic current i¯Sn in the learning control period $T_L$ as expressed by an expression (22), as the harmonic current detection technique for the learning control.

[Math. 20]

$$\bar{i}_{Sn[N]} = \bar{i}_{Sdn[N]} + j\bar{i}_{Sqn[N]} = \frac{1}{T_L}\int_{t-T_L}^{t} i_{Sdn}(t)\,dt + j\frac{1}{T_L}\int_{t-T_L}^{t} i_{Sqn}(t)\,dt \tag{22}$$

Since the learning control period $T_L$ is set as $T_L$=20 [ms] while the control period Ts of the periodic observer is Ts=100 [μs] under the condition of this description, for example, it is possible to determine the average value i¯Sn in the learning control period $T_L$ by averaging 200 data items obtained by sampling the harmonic sensed current $i_{Sn}$ at the control period Ts. Thus the average harmonic current i¯Sn can be calculated as in an expression (23) on the premise that the learning control period $T_L$ is an integral multiple of the control period Ts of the periodic disturbance observer.

[Math. 21]

$$\bar{i}_{Sn[N]} = \bar{i}_{Sdn[N]} + j\bar{i}_{Sqn[N]} = \frac{1}{T_L/T_S} \cdot \sum_{k=K-T_L/T_S}^{K} (I^*_{Sdn[k]} + j \cdot I^*_{Sqn[k]}) \tag{23}$$

In this expression, a suffix K indicate a k-th sampling of the periodic disturbance observer.

Similarly, an average I¯*n of the harmonic suppressing command current I*n.

[Math. 22]

$$\bar{I}^*_{n[N]} = \bar{I}^*_{dn[N]} + j \cdot \bar{I}^*_{qn[N]} = \frac{1}{T_L/T_S} \cdot \sum_{k=K-T_L/T_S}^{K} (I^*_{dn[k]} + j \cdot I^*_{qn[k]}) \quad (24)$$

Figure 3:
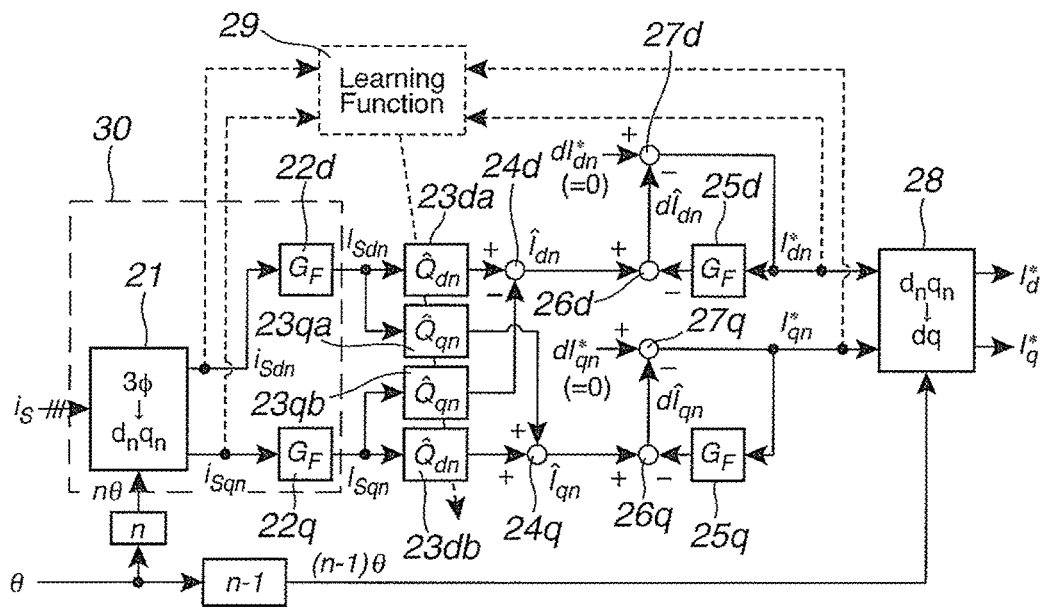
FIG. 3 is a control block diagram showing a periodic disturbance observer to harmonic of an n-th order frequency component according to a second embodiment.

FIG. 3 is a block diagram of the second embodiment. The input-output relationship of the real system is given by an expression (25).

[Math. 23]

$$\begin{cases} \bar{i}_{Sn[N]} = P_{n[N]}(\bar{I}^*_{n[N]} + dI_{n[N]}) \\ \bar{i}_{Sn[N-1]} = P_{n[N-1]}(\bar{I}^*_{n[N-1]} + dI_{n[N-1]}) \end{cases} \quad (25)$$

As in the first embodiment, the difference of each signal during one sample interval (the N-th sample–the (N−1)th sample) of the learning control period $T_L$ is defined as follows.

[Math. 24]

$$\begin{cases} \Delta \bar{i}_{Sn[N]} = \bar{i}_{Sn[N]} - \bar{i}_{Sn[N-1]} \\ \Delta \bar{I}^*_{n[N]} = \bar{I}^*_{n[N]} - \bar{I}^*_{n[N-1]} \\ \Delta P_{n[N]} = P_{n[N]} - P_{n[N-1]} \\ \Delta dI_{n[N]} = dI_{n[N]} - dI_{n[N-1]} \end{cases} \quad (26)$$

From the expressions (25) and (26), a following relationship holds about the differences during one sample interval.

[Math. 25]

$$\Delta \bar{i}_{Sn[N]} = P_{n[N]} \Delta \bar{I}^*_{n[N]} + \Delta P_{n[N]}(\bar{I}^*_{n[N]} - \Delta \bar{I}^*_{n[N]}) + \Delta dI_{n[N]} + \Delta dI_{n[N]}(P_{n[N]} - \Delta P_{n[N]}) \quad (27)$$

In general, the variation of the harmonic characteristics of the power system and the variation of the system impedance are gradual and the amounts of the variations are very small within the very short time of the learning control period $T_L$=20 ms. Therefore, an expression (28) is obtained by neglecting, as being approximately equal to zero, the difference $\Delta Pb[N]$ of the real system transfer characteristic and the difference $\Delta dIn[N]$ of the periodic disturbance current during one sample interval in the expression (27).

[Math. 26]

$$\Delta \bar{i}_{Sn[N]} \cong P_{n[N]} \Delta \bar{I}^*_{n[N]} \quad (28)$$

From the expression (28), the estimated value $P\hat{}n[N]$ of the transfer characteristic of the real system to the n-th order harmonic of the N-th sample is estimated as an expression (29).

[Math. 27]

$$\Delta \hat{P}_{n[N]} \cong \frac{\Delta \bar{i}_{Sn[N]}}{\Delta \bar{I}^*_{n[N]}} \quad (29)$$

Therefore, the inverse model $Q\hat{}n$ ($=P\hat{}^{-1}n$) of the periodic disturbance for the n-th order harmonic of the N-th sample is given by an expression (30).

[Math. 28]

$$\Delta \hat{Q}_{n[N]} \cong \frac{\Delta \bar{I}^*_{n[N]}}{\Delta \bar{i}_{Sn[N]}} \quad (30)$$

By expanding the expression (30) with the $d_n q_n$ rotating coordinate system, the d axis and q axis estimated inverse models $Q\hat{}dn[N]$ and $Q\hat{}qn[N]$ of the n-th order harmonic in the N-th sample are given by an expression or equation (31).

[Math. 29]

$$\begin{cases} \hat{Q}_{dn[N]} = \dfrac{(\bar{i}_{Sdn[N]} - \bar{i}_{Sdn[N-1]})(\bar{I}^*_{dn[N]} - \bar{I}^*_{dn[N-1]}) + (\bar{i}_{Sqn[N]} - \bar{i}_{Sqn[N-1]})(\bar{I}^*_{qn[N]} - \bar{I}^*_{qn[N-1]})}{(\bar{i}_{Sdn[N]} - \bar{i}_{Sdn[N-1]})^2 + (\bar{i}_{Sqn[N]} - \bar{i}_{Sqn[N-1]})^2} \\ \hat{Q}_{qn[N]} = \dfrac{(\bar{i}_{Sdn[N]} - \bar{i}_{Sdn[N-1]})(\bar{I}^*_{qn[N]} - \bar{I}^*_{qn[N-1]}) + (\bar{i}_{Sqn[N]} - \bar{i}_{Sqn[N-1]})(\bar{I}^*_{dn[N]} - \bar{I}^*_{dn[N-1]})}{(\bar{i}_{Sdn[N]} - \bar{i}_{Sdn[N-1]})^2 + (\bar{i}_{Sqn[N]} - \bar{i}_{Sqn[N-1]})^2} \end{cases} \quad (31)$$

Figure 4:
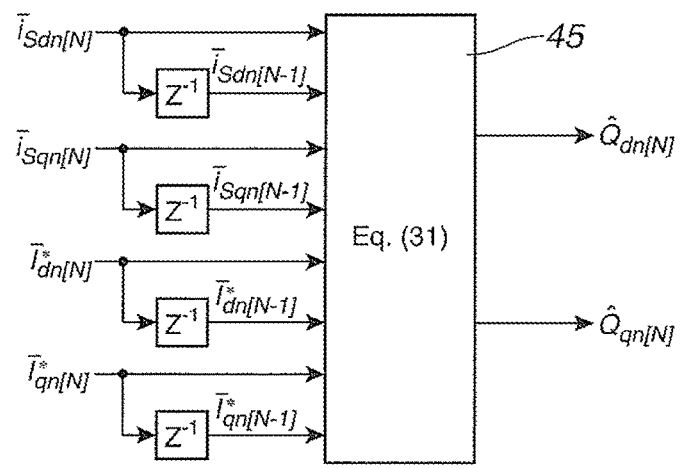
FIG. 4 is a block diagram showing a learning control section according to the second embodiment.

FIG. 4 is a block diagram of the learning control section 29 shown in FIG. 3. The current average sampling values $i^-_{Sdn[N]}$ and $i^-_{Sqn[N]}$ of the sensed harmonic current and the current average sampling values $I^{-*}_{dn[N]}$ and $I^{-*}_{qn[N]}$ of the harmonic suppressing commands, and the previous average sampling values $i^-_{Sdn[N-1]}$, $i^-_{Sqn[N-1]}$, $i^{-*}_{dn[N-1]}$ and $i^{-*}_{qn[N-1]}$ obtained through delay circuits $Z^{-1}$ are substituted into the inverse model estimating expression of the expression or equation (31). The estimated inverse models $Q\hat{}_{dn[N]}$ and $Q\hat{}_{qn[N]}$ are applied to the multipliers 23da, 23db, 23qa and 23qb of periodic disturbance observer 12 successively.

According to the second embodiment, the model is estimated by using the average or mean values obtained by averaging the harmonic sensed current $i_{Sn}$ and the harmonic suppressing command current I*n obtained during the time interval of the control period Ts of the periodic disturbance observer 12. Therefore, in addition to the effects of the first embodiment, the second embodiment makes it possible to estimate the reciprocals $Q_{dn}$ and $Q_{qn}$ of the periodic disturbance observer 12 with the learning control period $T_L$ speedily without being affected by the detection response delay of LPF GF(s) as in the first embodiment.

Embodiment 3

When the denominator becomes equal to zero in the inverse model estimating expression (31) of the second embodiment, for example, the calculation becomes unfeasible in the form of division by zero. Therefore, the third embodiment employs means for preventing division by zero in the control system of the first embodiment or the second embodiment.

In the following explanation, the expression (31) of the second embodiment is taken as an example. The denominator in the expression (31) is expressed by a following equation (den: denominator).

[Math. 30]

$$\text{den} = (\bar{i}_{Sdn[N]} - \bar{i}_{Sdn[N-1]})^2 + (\bar{i}_{Sqn[N]} - \bar{i}_{Sqn[N-1]})^2 \quad (32)$$

The denominator den is expressed by the differences during one sample interval of the d axis component and the q axis component in the average value of the harmonic sensed current in. Therefore, when the variation of the harmonic sensed current $i_{S_n}$ during one sample interval of the learning control period $T_L$ becomes zero, then the denominator den becomes equal to zero.

Figure 5:
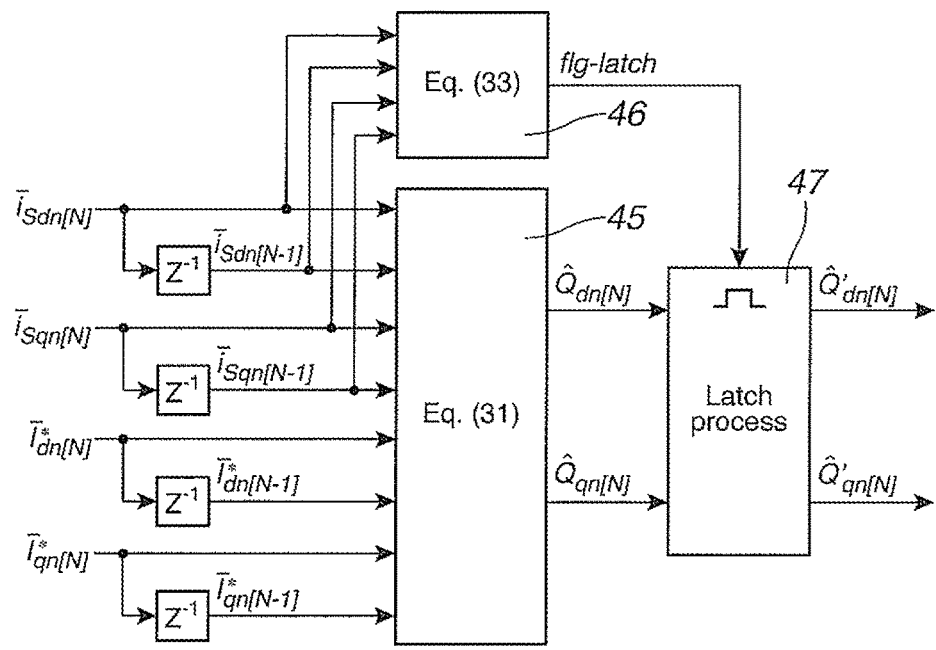
FIG. 5 is a block diagram showing a learning control section according to a third embodiment.

Therefore, as shown in an expression or equation (33) and FIG. 5, when the denominator den is smaller than or equal to an arbitrary threshold Th, the control system performs a sequential operation to turn off the learning control and holds the estimated inverse models Q^dn[N] and Q^qn[N] just before the turn-off, unchanged during the period of the turn-off. In FIG. 5, flg-latch is a latch flag, and Q^'dn and Q^'qn are estimated model values obtained by an inverse latch operation.

[Math. 31]

$$\begin{cases} den = (i_{Sdn[N]} - i_{Sdn[N-1]})^2 + (i_{Sqn[N]} - i_{Sqn[N-1]})^2 &, flg-\text{latch} = 0 \ (\text{if}: den > Th) \\ den = Th &, flg-\text{latch} = 1 \ (\text{if}: den \leq Th) \end{cases} \quad (33)$$

The control system of the third embodiment can prevent the division by zero, of the equation to find the estimated values Q^dn[N] and Q^qn[N] of the inverse model, stop the learning function of the model at the operating condition generating the division by zero, hold the estimated inverse model values Q^dn[N] and Q^qn[N] just before the stoppage of the learning function and output the estimated inverse model values immediately before the stoppage.

Embodiment 4

Figure 6:
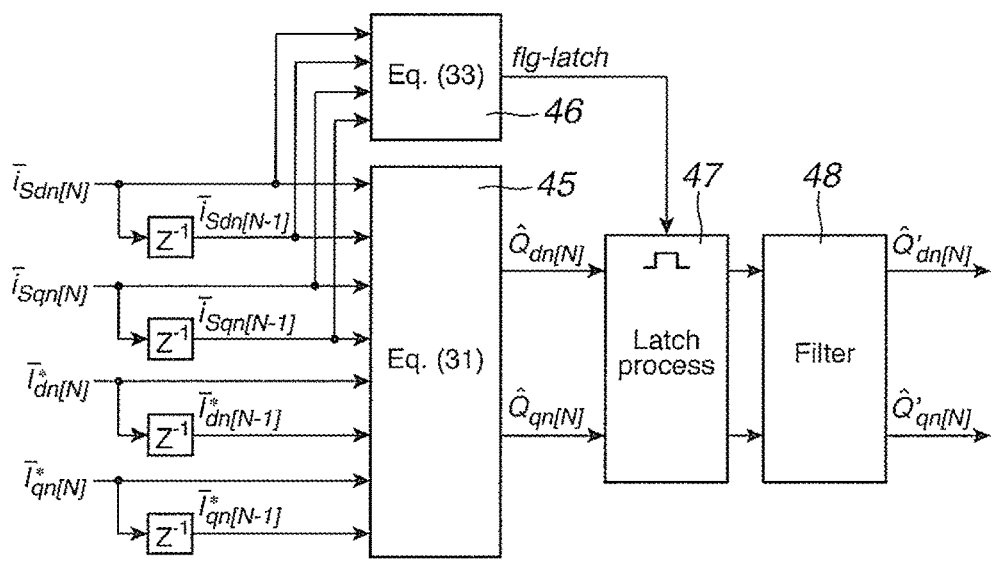
FIG. 6 is a block diagram showing a learning control section according to a fourth embodiment.

The actual system involves measurement errors and might result in unexpected control operation in case of the application of the estimation result of the observer model directly to the inverse models Q^dn[N] and Q^qn[N] of the periodic disturbance observer. Therefore, as shown in FIG. 6, a fourth embodiment employs an arbitrary filter 48 at an output portion outputting the estimation result of the observer model, in addition to the third embodiment.

Though the type of filter 48 is not limited specifically, the use of a low pass filter of a kind exerting no influence on the response speed of the estimation result of the observer model or a moving average filter, or the operation of limiting the rate of change is effective for providing performance following the correct observer model gently and avoiding abrupt change of the observer model.

Embodiment 5

Figure 7:
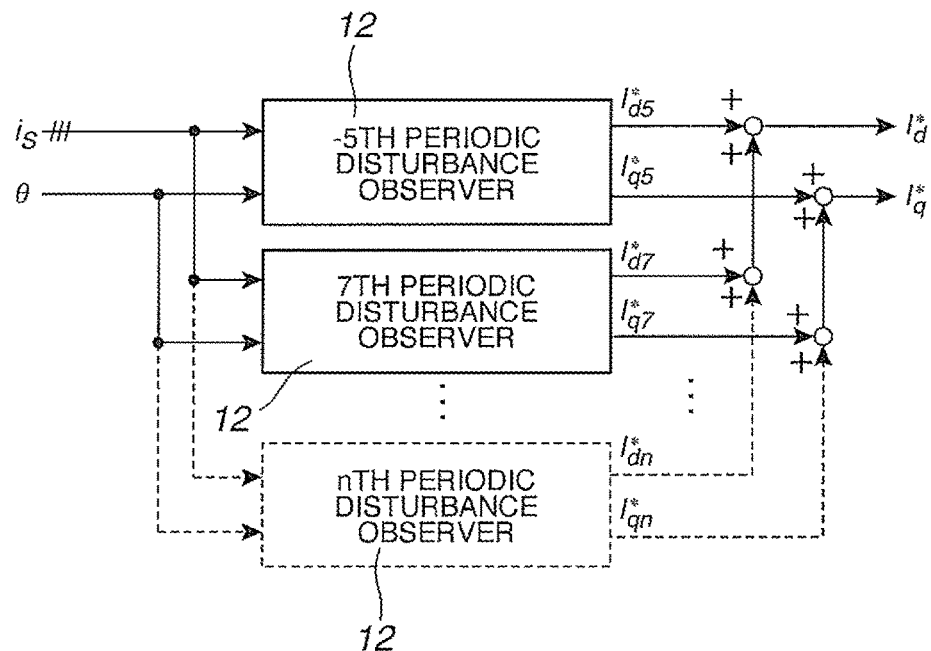
FIG. 7 is a view showing a periodic disturbance suppression control apparatus according to a fifth embodiment.

As shown in FIG. 7, a control system according to a fifth embodiment is designed to deal with a plurality of harmonic components of orders (−5th order, 7th order . . . n-th order, for example) with a parallel arrangement of the control configurations of the periodic disturbance observers 12 according to one of the first to fourth embodiment.

The inside of the periodic disturbance observer 12 of each other is identical to that shown in one of the first to fourth embodiments. The d axis harmonic suppressing command current I*d is determined by adding up the d axis components I*d5, I*d7 . . . I*dn of the harmonic suppression command of the orders, and the q axis harmonic suppressing command current I*q is determined by adding up the q axis components I*q5, I*q7 . . . I*qn of the harmonic suppression command of the orders.

The fifth embodiment can suppress the harmonic components of the plurality of orders simultaneously, in addition to the effects and operations of the first to fourth embodiments.

Embodiment 6

As one of the important points in the actual system using the power conversion device functioning as the active filter, the system cannot compensate for the harmonic current exceeding the capacity of the power conversion device. The active filter connected with the power system can supply the harmonic suppression current as long as possible. In this case, however, the active filter operates in the state in which the harmonic suppressing command currents I*dn and I*qn are saturated. Therefore, a sixth embodiment proposes the model learning function and harmonic suppressing technique in the saturated state of the harmonic suppressing command current.

Figure 8:
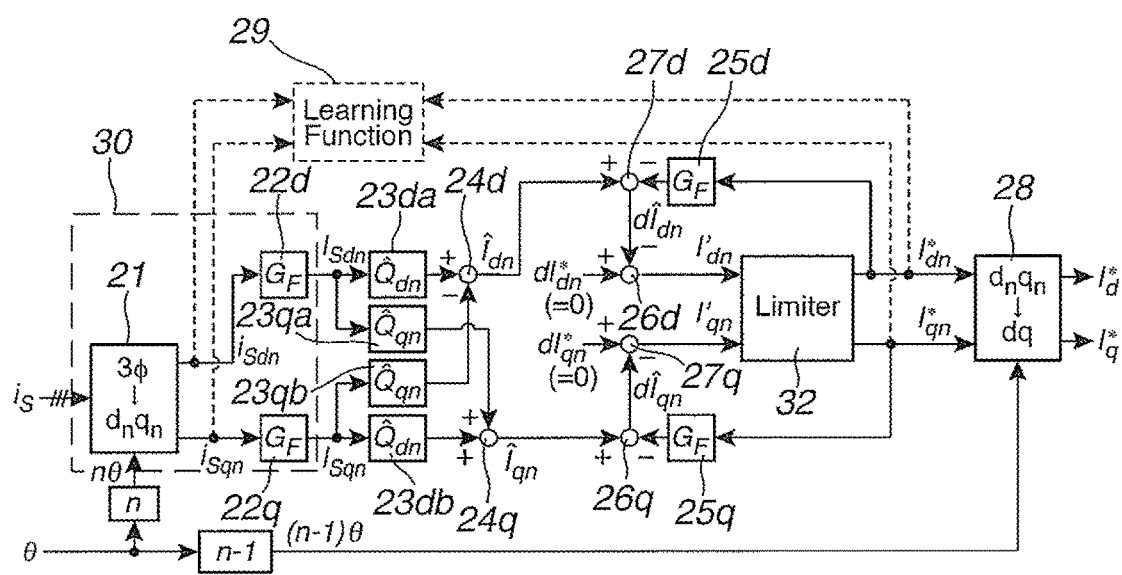
FIG. 8 is a control block diagram showing a periodic disturbance observer to harmonic of an n-th order frequency component according to a sixth embodiment.

The harmonic suppressing effect becomes lower when the device capacity of the inverter becomes insufficient to the harmonic compensation quantity for compensation. The required compensation capacities are different in dependence on the orders of the harmonics, and the harmonic suppressing control taking no account of this difference might be unable to provide the effect of suppressing the harmonic of a specified order. Therefore, as shown in FIG. 8, the sixth embodiment employs a limiter 32 for limiting the command amplitude for the harmonic suppressing command currents (before limiter) I'dn and I'qn of the periodic disturbance observer 12 designed for control of each order of the harmonics.

The learning control section 29 employs the configuration of FIG. 2. However, the values after the limiter are used as the harmonic suppressing command currents I*dn and I*qn. Limiter 32 limits only the amplitudes of the harmonic suppressing command currents (before limiter) I'dn and I'qn, to a desired limit value $\text{Lim}_n$. The phases of the harmonic suppressing command currents I*dn and I*qn are not limited and allowed to vary freely even if the amplitudes are limited by limiter 32. The above-mentioned learning function can be performed properly to estimate the model Q^n of the periodic disturbance observer 12 as long as changes in the dnqn coordinates are read for the harmonic suppressing command currents I*dn and I*qn and the periodic disturbance sensed currents $I_S$dn and $I_S$qn or the sensed harmonic currents $i_S$dn and $i_S$qn. Therefore, it is possible to continue the estimation of the inverse model Q^n of the periodic disturbance observer 12 with the learning control function even during the limiter operation if there is a change in the phase while the amplitude is limited.

Thus, the suppression can be performed effectively by automatically searching the harmonic suppressing current phase capable of suppressing the harmonic most within the range of the amplitude limitation. The control apparatus can cause the inverse model Q^n of the periodic disturbance observer 12 to follow correctly even if the amplitude and phase characteristics of the system and the harmonic component have been changed during the operation.

Figure 9:
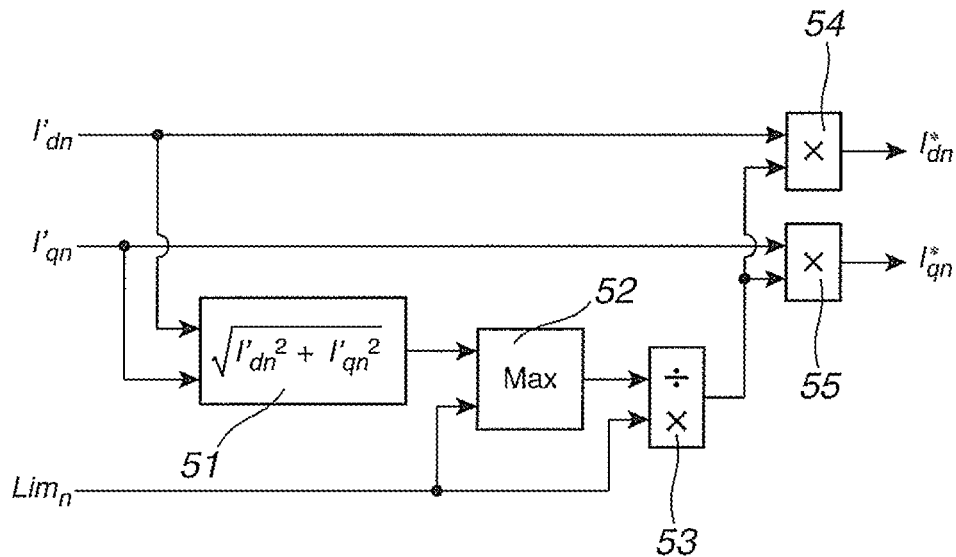
FIG. 9 is a block diagram showing a limiter in the sixth embodiment.

FIG. 9 shows an implementation example of limiter 32. FIG. 9 is a merely one example. It is possible to employ any of various other implementation forms as long as only the amplitude is limited.

An amplitude calculating section 51 determines an amplitude $\sqrt{I'dn^2+I'qn^2}$, from the harmonic suppressing command currents (before limiter) I'dn and I'qn. A comparator 52 compares the amplitude $\sqrt{I'dn^2+I'qn^2}$ with a desired limit value $Lim_n$. By using a greater one chosen by the comparison, a dividing section 53 divides the limit value $Lim_n$. Thus, the ratio of the limitation is outputted. Multipliers 54 and 55 multiply the n-th order harmonic suppressing command currents I'dn and I'qn, by the ratio obtained by the dividing section and thereby outputs the final n-th order harmonic suppressing command currents I*dn and I*qn.

Embodiment 7

Figure 10:
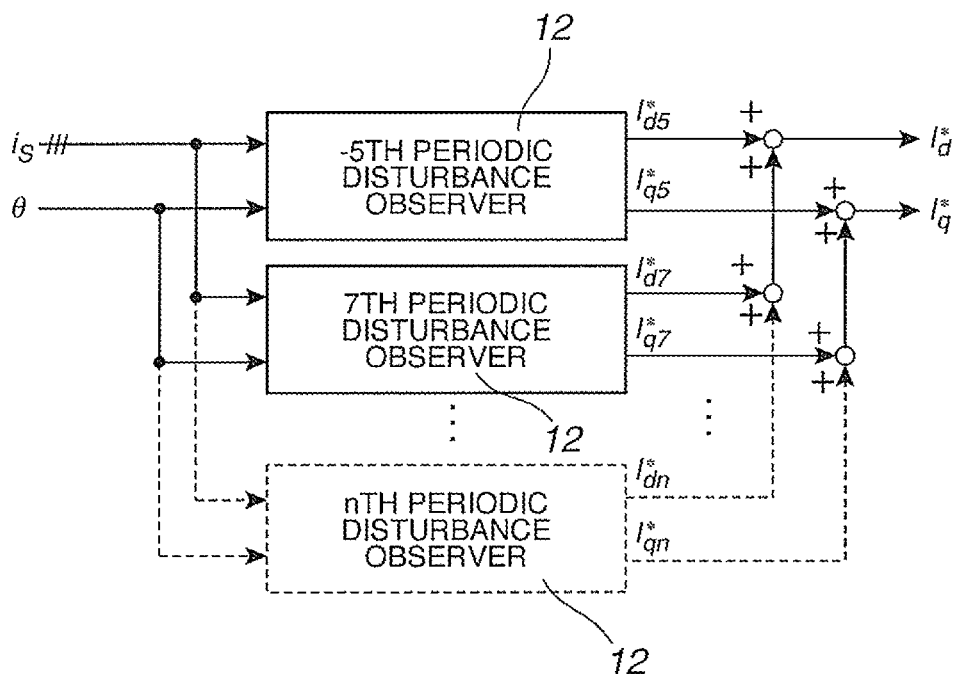
FIG. 10 is a view showing a periodic disturbance suppressing control apparatus according to a seventh embodiment.

As shown in FIG. 10, a control system according to a seventh embodiment is designed to deal with a plurality of harmonic components of orders (−5th order, 7th order . . . n-th order, for example) with a parallel arrangement of the control configurations of the periodic disturbance observers 12.

The inside of the periodic disturbance observer 12 of each order is identical to that shown in FIG. 8. The d axis harmonic suppressing command current I*d is determined by adding up the d axis components I*d5, I*d7 . . . I*dn of the harmonic suppression command of the orders, and the q axis harmonic suppressing command current I*q is determined by adding up the q axis components I*q5, I*q7 . . . I*qn of the harmonic suppression command of the orders.

The seventh embodiment can suppress the harmonic components of the plurality of orders simultaneously, in addition to the effects and operations of the sixth embodiment.

Moreover, the limit values of the limiters of the different orders can be set individually and arbitrarily. For example, the impedance of the harmonic component of a higher order tends to become higher, and hence the inverter voltage required for generating the harmonic disturbance suppressing current tends to become higher, so that the tendency of voltage saturation is increased. Therefore, by setting the limit value lower for the higher order, the control system can perform the operation restraining the proportion of the suppression for the higher order harmonic, and laying emphasis on the suppression of lower order harmonic components.

Furthermore, it is possible to monitor the proportions of the component of each order of the sensed harmonic, and to determine the limit values by laying emphasis on the suppression of the order having a larger proportion.

Although the above detailed explanation is directed to practical examples in which the present invention is applied to the harmonic suppression of the power system with the periodic disturbance observer, various variation and modifications are possible within the purview of the technical concept of the present invention. The present invention is applicable widely to the suppression of periodic disturbance of a controlled object in general. These variations and modifications are naturally within the scope of the patent claims.

The invention claimed is:

1. A periodic disturbance suppressing control apparatus comprising:
an input device configured to sense a controlled object in a form of a current;
a controller configured to produce a periodic disturbance suppressing command in accordance with the current of the controlled object; and
an output device configured to suppress the periodic disturbance of the controlled object in accordance with the periodic disturbance suppressing command;
the controller configured to:
sense a periodic disturbance of the controlled object as a sensed periodic disturbance in a form of a direct current component;
determine an estimated periodic disturbance by calculating a difference between a first signal and a second signal, the first signal obtained by multiplication of the sensed periodic disturbance by a reciprocal of a transfer characteristic, the transfer characteristic being from the periodic disturbance suppressing command to the sensed periodic disturbance, the second signal obtained by adding only a detection delay to the periodic disturbance suppressing command;
produce the periodic disturbance suppressing command from the estimated periodic disturbance; and
correct the reciprocal of the transfer characteristic in accordance with a quantity determined by dividing a variation of the periodic disturbance suppressing command by a variation of the sensed periodic disturbance.

2. The periodic disturbance suppressing control apparatus as recited in claim 1, wherein the periodic disturbance suppressing control apparatus is arranged to suppress the periodic disturbance by superposing the periodic disturbance suppressing command on a command of a power conversion device connected with a system bus of a power source.

3. The periodic disturbance suppressing control apparatus as recited in claim 1, wherein the controller is configured to use average values during an interval of a control period of a periodic disturbance observer, as the sensed periodic disturbance and the period disturbance suppressing command.

4. The periodic disturbance suppressing control apparatus as recited in claim 3, wherein the controller is configured to stop a learning control and output the reciprocal of the transfer characteristic just before stoppage when the difference during a one sample interval in an average value of the sensed periodic disturbance is lower than or equal to a threshold value.

5. The periodic disturbance suppressing control apparatus as recited in claim 1, wherein the controller includes a filter suppressing abrupt change in the reciprocal of the transfer characteristic.

6. The periodic disturbance suppressing control apparatus as recited in claim 1, wherein there is provided a limiter to limit an amplitude of the periodic disturbance suppressing command when the amplitude of the periodic disturbance suppressing command is greater than a limit value.

7. The periodic disturbance suppressing control apparatus as recited in claim 1, wherein a plurality of the periodic disturbance suppressing control apparatus are arranged in parallel and configured to suppress periodic disturbances of a plurality of orders.

8. The periodic disturbance suppressing control apparatus as recited in claim 1, wherein the controller is configured to stop a learning control and output the reciprocal of the transfer characteristic just before stoppage when the difference during a one sample interval of the sensed periodic disturbance is smaller than or equal to a threshold value.

9. The periodic disturbance suppressing control apparatus as claimed in claim 1, wherein the controller is configured to set the variation of the sensed periodic disturbance equal to a difference between a previous value of the sensed periodic disturbance determined from a previous sample of data collected in a previous cycle of the correcting the reciprocal of the transfer characteristic performed periodically and a current value of the sensed periodic disturbance determined from a current sample of data collected in a current cycle next to the previous cycle of the correcting the reciprocal of the transfer characteristic, and to set the variation of the periodic disturbance suppressing command equal to a difference between a previous value of the periodic disturbance suppressing command determined from the previous sample in the previous cycle and a current value of the periodic disturbance suppressing command determined from the current sample in the current cycle.

10. The periodic disturbance suppressing control apparatus as claimed in claim 9, wherein the controller is configured to use, as the previous value of the sensed periodic disturbance, a previous average value of the sensed periodic disturbance determined by averaging values of the sensed periodic disturbance sampled during the previous cycle of the correcting the reciprocal of the transfer characteristic, to use, as the current value of the sensed periodic disturbance, a current average value of the sensed periodic disturbance determined by averaging values of the sensed periodic disturbance sampled during the current cycle next to the previous cycle, to use, as the previous value of the periodic disturbance suppressing command, a previous average value of the periodic disturbance suppressing command determined by averaging values of the periodic disturbance suppressing command sampled during the previous cycle of the correcting the reciprocal of the transfer characteristic and to use as the current value of the periodic disturbance suppressing command, a current average value of the periodic disturbance suppressing command determined by averaging values of the periodic disturbance suppressing command sampled during the current cycle of the correcting the reciprocal of the transfer characteristic.

11. The periodic disturbance suppressing control apparatus as recited in claim 1, wherein the output device includes a power conversion device adapted to be connected with a system bus of a power source, and the input device includes a current sensor configured to sense the controlled object which is a system current flowing through the system bus.

12. The periodic disturbance suppressing control apparatus as recited in claim 11, wherein the power conversion device includes an active filter, and the controller is arranged to control the active filter.

13. A periodic disturbance suppressing control process comprising:
sensing a controlled object in a form of a current;
sensing a periodic disturbance of the controlled object as a sensed periodic disturbance in a form of a direct current component;
determining an estimated periodic disturbance by calculating a difference between a first signal and a second signal, the first signal obtained by multiplication of the sensed periodic disturbance by a reciprocal of a transfer characteristic, the transfer characteristic being from a periodic disturbance suppressing command to the sensed periodic disturbance, the second signal obtained by adding only a detection delay to the periodic disturbance suppressing command;
producing the periodic disturbance suppressing command from the estimated periodic disturbance; and correcting the reciprocal of the transfer characteristic in accordance with a quantity determined by dividing a variation of the periodic disturbance suppressing command by a variation of the sensed periodic disturbance; and
controlling a power conversion device in accordance with the periodic disturbance suppressing command to suppress the periodic disturbance of the controlled object.

14. The periodic disturbance suppressing control process as claimed in claim 13, wherein the variation of the sensed periodic disturbance is a difference between a previous value of the sensed periodic disturbance determined in a previous cycle of the correcting the reciprocal of the transfer characteristic performed periodically and a current value of the sensed periodic disturbance determined in a current cycle next to the previous cycle of the correcting the reciprocal of the transfer characteristic, and
the variation of the periodic disturbance suppressing command is a difference between a previous value of the periodic disturbance suppressing command determined in the previous cycle and a current value of the periodic disturbance suppressing command determined in the current cycle.

15. The periodic disturbance suppressing control process as claimed in claim 14, wherein the previous value of the sensed periodic disturbance is a previous average value of the sensed periodic disturbance determined by averaging values of the sensed periodic disturbance sampled during the previous cycle of the correcting the reciprocal of the transfer characteristic performed periodically, the current value of the sensed periodic disturbance is a current average value of the sensed periodic disturbance determined by averaging values of the sensed periodic disturbance sampled during the current cycle next to the previous cycle, the previous value of the periodic disturbance suppressing command is a previous average value of the periodic disturbance suppressing command determined by averaging values of the periodic disturbance suppressing command sampled during the previous cycle of the correcting the reciprocal of the transfer characteristic and the current value of the period disturbance suppressing command is a current average value of the periodic disturbance suppressing command determined by averaging values of the periodic disturbance suppressing command sampled during the current cycle.

16. The periodic disturbance suppressing control process as claimed in claim 13, further comprising stopping a learning control and outputting a most recent value of the reciprocal of the transfer characteristic just before stoppage when the variation of the sensed periodic disturbance is smaller than or equal to a predetermined threshold value.

17. A periodic disturbance suppressing control apparatus comprising:
an input device including a current sensor configured to sense a controlled object in a form of a system current at a connection point of a system bus of a power source;
a controller configured to produce a periodic disturbance suppressing command in accordance with the system current of the controlled object; and
an output device including a power conversion device adapted to be connected with the system bus of the power source at the connection point, and to suppress a periodic disturbance of the system current in accordance with the periodic disturbance suppressing command;

the controller being configured to:
- sense a periodic disturbance of the controlled object as a sensed periodic disturbance in a form of a direct current component;
- determine an estimated periodic disturbance by calculating a difference between a first signal and a second signal, the first signal obtained by multiplication of the sensed periodic disturbance by a reciprocal of a transfer characteristic, the transfer characteristic being from the periodic disturbance suppressing command to the sensed periodic disturbance, the second signal obtained by adding a detection delay to the periodic disturbance suppressing command;
- produce the periodic disturbance suppressing command from the estimated periodic disturbance; and
- correct the reciprocal of the transfer characteristic in accordance with a quantity which is a quotient determined by dividing a variation of the periodic disturbance suppressing command by a variation of the sensed periodic disturbance.

18. The periodic disturbance suppressing control apparatus as claimed in claim 17, wherein the controller is configured to set the variation of the sensed periodic disturbance equal to a difference between a previous value of the sensed periodic disturbance determined from a previous sample of data collected in a previous cycle of the correcting the reciprocal of the transfer characteristic performed periodically and a current value of the sensed periodic disturbance determined from a current sample of data collected in a current cycle next to the previous cycle of the correcting the reciprocal of the transfer characteristic, and to set the variation of the periodic disturbance suppressing command equal to a difference between a previous value of the periodic disturbance suppressing command determined from the previous sample in the previous cycle and a current value of the periodic disturbance suppressing command determined from the current sample in the current cycle.

* * * * *